Patented Aug. 2, 1932

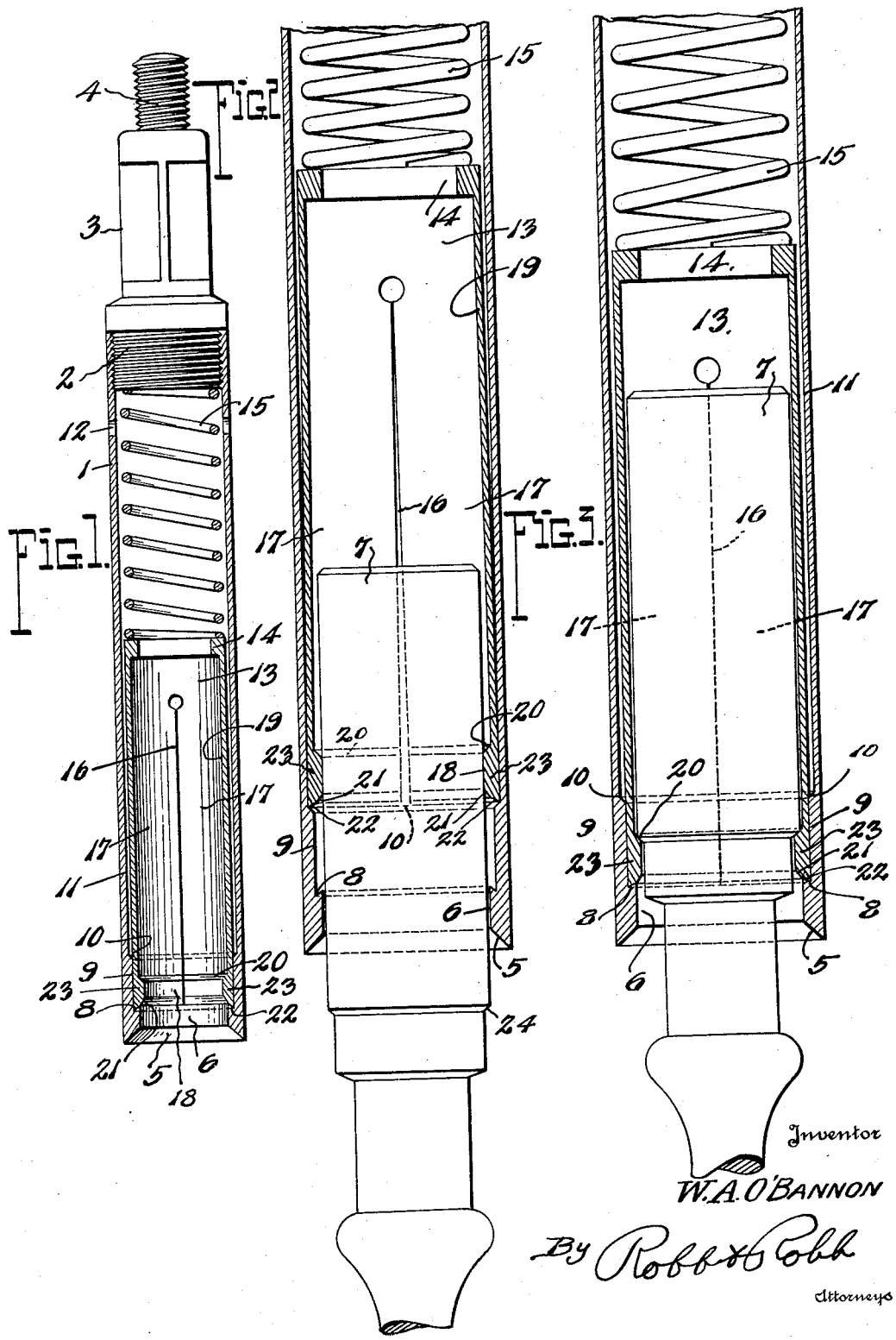

1,869,861

UNITED STATES PATENT OFFICE

WALTER A. O'BANNON, OF TULSA, OKLAHOMA

SUCKER ROD FISHING TOOL

Application filed March 9, 1931. Serial No. 521,332.

This invention relates to fishing tools of the overshot type for use in recovery of lost sucker rods, pipes and other similar parts from deep wells, the tool being designed to telescope over the part left in the well and firmly interlock therewith to permit withdrawal thereof from the well by the tool.

More specifically, my invention relates to tools especially designed for engagement with the rod joint boxes or couplings. These boxes or couplings are usually especially tempered or hardened and for this reason preclude the use of the gripping type of sucker rod socket since the jaws thereof cannot be made to engage satisfactorily the hardened surface for withdrawal purposes.

An object of my invention is, therefore, to provide a sucker rod fishing tool adapted to engage the hardened joint section or box of the rod to permit the same to be positively interlocked with the tool for withdrawal purposes.

Another object of my invention is to provide a socket wherein the lower part of the rod box is arranged to be positively supported by the fishing tool during the withdrawal from the well.

A further object is to provide a fishing tool which is formed with a supporting shoulder adjacent to the entrance and a slidable detent arranged to move under the lower portion of the box after the box has passed into the tool and cooperate with the supporting shoulder and the lower portion of the box and positively interlock the tool with the rod for withdrawing purposes.

Other and further objects and advantages of the invention will be hereinafter set forth and the novel features thereof defined by the appended claims.

Fig. 1 is a longitudinal sectional view through a fishing tool constructed in accordance with my invention, the head being shown in elevation;

Fig. 2 is an enlarged longitudinal, fragmentary, sectional view of the box showing the relative position of the parts when the tool is being telescoped over a sucker rod socket box; and Fig. 3 is a view similar to Fig. 2, showing the box fully telescoped within the tool and the parts in interlocked or lifting position.

Like reference numerals refer to like parts in the several figures of the drawing in which 1 indicates the body or barrel of the fishing tool, being threaded at one end at 2 to receive the supporting head 3. The head is provided with a threaded portion 4 for attachment to the usual sucker rod or supporting cable (not shown). The body 1 is formed at the other end with an inwardly flared sucker rod box receiving opening 5 and a circular restricted bore 6 of substantially the diameter of the sucker rod box 7, as seen in Fig. 2.

The bore 6 extends inwardly for a short distance and terminates in the outwardly and downwardly inclined supporting shoulder 8. The internal bore of the barrel from this shoulder is increased, as indicated at 9, and extends upwardly to the second inclined shoulder or tapered portion 10 which inclines upwardly and outwardly to the main bore 11 of the barrel. The barrel is preferably vented at 12 to permit discharge of any dirt or mud contained therein during the fishing operation.

Slidably disposed within the barrel 1 is the detent member 13 which is formed at one end with an annular, inwardly extending flange 14 arranged to support the compression spring 15. The detent member 13 is slit longitudinally of its length at a plurality of points, such as indicated at 16, to provide detent fingers 17. The lower end of the detent member 13, before the slitting operation, is formed with an annular constricted opening or bore 18, the diameter of which is less than the diameter of the box 7 which is to be engaged. From this point, the bore 18 tapers upwardly and outwardly to the main cylindrical bore 19 of the detent member, the tapered portion being indicated at 20 and constituting a supporting shoulder for the box of the sucker rod after the same has been inserted into the main cylindrical bore 19. The entrance portion of the restricted opening 18 of the detent member is tapered outwardly and downwardly, as indicated at 21 and 22, the external diameter of the detent member being substantially the same as the internal bore 9 so as to permit the tapered portion 22 to cooperate with the supporting shoulder 8, as seen in Figs. 1 and 3, the portion of the detent member 13 between the supporting shoulder 20 and the inclined shoulders 22 and 21 constituting detents 23 after the detent member 13 has been slit, as indicated at 16.

The parts of the device are normally in the position shown in Fig. 1 of the drawing, the detent member being forced downwardly into cooperative position with respect to the intermediate bore 9 and the supporting shoulder 8, the compression spring 15 being utilized for this purpose.

The socket is attached to the usual lowering means, such as a sucker rod, and is lowered into the well for the fishing operation.

The continued lowering action will cause the flanged opening 5 of the barrel to guide the box 7 of the sucker rod into the restricted bore 6, and upon engagement of the end of the box 7 with the tapered or beveled portion 21 of the detents 23, moves them upwardly into the enlarged bore 11 of the barrel. When the detents 23 reach this enlarged portion, they will be cammed outwardly, as shown in Fig. 2 of the drawing, to permit the box to pass through the opening or bore 18 formed by the detents 23.

After the box 7 has passed beyond the detents 23, they will be released and permitted to spring back to their normal position, as shown in Figs. 1 and 3, the spring 15 forcing the detent member 13 downwardly into the intermediate bore 9. Under these conditions, it will be observed that the detents 23 will be supported against longitudinal movement by the shoulder 22 and against lateral movement by the wall forming the bore 9, and since the diameter of the bore 18 is less than the diameter of the box 7, the box will be fully supported, as shown in Fig. 3, by the shoulders 20 of the detents. Since the weight of the rod is transmitted substantially downwardly through the detents 23 upon the shoulder 8 of the barrel, there is no tendency for the excessive weight of the sucker rod to expand or cause distortion of the detent member or the end of the barrel.

The detent member is preferably formed of resilient material, such as tempered steel, so as to spring back into its contracted position, as shown in Fig. 3, after the box has passed into the internal bore thereof.

In order to remove the box from the socket after the rod has been withdrawn from the well, it is only necessary to move the detent member 13 upwardly with respect to the barrel to the position shown in Fig. 2 and support the same in this position, whereupon the engagement of the shoulder 24 at the lower end of the box with the shoulders 20 of the detents will cause them to be moved outwardly into their released position, as seen in Fig. 2 of the drawing.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:—

1. A sucker rod fishing tool comprising a barrel, a lifting detent movably mounted therein and expansible in said barrel to receive a sucker rod, said detent having internal shoulder engaging means at one end to engage beneath a shoulder on the rod, said barrel being provided with an internal supporting stop to receive the end of the detent when the latter has contracted into the engaging relation aforesaid.

2. A sucker rod fishing tool comprising a barrel, and a lifting detent movably mounted therein and expansible when moved upwardly in said barrel to receive a sucker rod, said detent being provided with resilient contractable fingers having shoulders thereon to engage beneath a shoulder on the rod to be lifted, said barrel being provided with an internal supporting stop shoulder to receive the end of the detent when the latter has contracted into the engaging relation aforesaid.

3. In a sucker rod fishing tool comprising a barrel, a cylindrical lifting detent movably mounted therein, said detent being split longitudinally to provide resilient contractable detent fingers having internal shoulder engaging means at one end to engage beneath a shoulder on the sucker rod when in contracted position, said barrel being provided with a supporting stop shoulder to receive the end of the detent fingers when the latter have contracted into the aforesaid rod engaging relation.

4. In a sucker rod fishing tool comprising a barrel, a cylindrical lifting detent movably mounted therein, said detent being split longitudinally to provide resilient contractable detent fingers having internal shoulder engaging means at one end to engage beneath a shoulder on the sucker rod when in contracted position, said barrel being provided with a supporting stop shoulder to receive the end of the detent fingers when the latter have contracted into the aforesaid rod engaging relation, and means on the barrel for locking the detent fingers in contracted position when in engagement with the supporting stop shoulder aforesaid.

5. In a sucker rod fishing tool, a barrel having a restricted bore at one end, a lifting detent movably mounted in the barrel and expansible to receive a sucker rod, said detent having internal shoulder engaging means at one end to engage beneath a shoulder on the rod, said restricted bore of the barrel being provided with internal supporting stop means to engage with the detent when the latter has been contracted into the aforesaid relation with respect to the rod, means to move the detent into engagement with the stop means aforesaid, and means on the barrel for locking the detent in contracted position when in engagement with said stop shoulder.

6. In a sucker rod fishing tool, a barrel, a cylindrical lifting detent movably mounted therein, said detent having resilient fingers forming internal shoulder engaging means arranged to engage a shoulder on the rod to be lifted, said fingers being expansible within the barrel to receive a sucker rod and resiliently contractable to engage the shoulder aforesaid on the rod, said barrel being provided with an internal detent supporting stop shoulder to engage the detent fingers when in contracted position, and means on the barrel to lock the detent fingers in said contracted position when engaged with the supporting stop shoulder aforesaid.

7. In a sucker rod fishing tool, a barrel, a lifting detent movably mounted within the barrel, said detent being formed with resilient detent fingers having internal shoulder engaging means arranged to engage beneath a shoulder on the sucker rod to be lifted, said detent being movable upwardly in the barrel to permit the fingers to expand to allow the rod to be lifted to be received in the barrel, said barrel being formed with a restricted opening, a detent supporting shoulder adjacent to the opening to support the detent fingers when in contracted position, and means within the barrel for moving the detent fingers into the supporting position aforesaid.

8. In a fishing tool for sucker rods, a barrel, a cylindrical lifting detent mounted for longitudinal movement within the barrel, said detent being formed at one end with an annular internal shoulder, the detent being slit longitudinally from the said end to provide a plurality of resilient detent fingers which are expansible when the detent is moved to one position in the barrel to permit the sucker rod to be passed into the detent, and means on the barrel for preventing outward longitudinal or lateral movement of the detent fingers when the detent is moved to another position in the body.

9. In a fishing tool for sucker rod couplings, a barrel, an expansible lifting detent movably mounted within the barrel and shiftable in one position therein to permit the passage of a sucker rod coupling therethrough, a supporting stop shoulder on the barrel for engagement with the detent when in operative position to prevent longitudinal movement thereof, means on the barrel for engagement with the expansible detent when in operative position to prevent expansion thereof, and means on the detent for engaging a shoulder on the rod coupling when in contracted position to constitute lifting means for the sucker rod.

In testimony whereof I affix my signature.
WALTER A. O'BANNON.